(12) United States Patent
Yamazaki et al.

(10) Patent No.: US 7,205,502 B2
(45) Date of Patent: Apr. 17, 2007

(54) REFLECTOR-MIRROR DRIVE SHAFT CONTROLLER FOR LASER BEAM MACHINE

(75) Inventors: Tsunehiko Yamazaki, Aichi pref. (JP); Naoomi Miyakawa, Aichi pref. (JP)

(73) Assignee: Yamazaki Mazak Corporation, Aichi. Pref. (JP)

( * ) Notice: Subject to any disclaimer, the term of this patent is extended or adjusted under 35 U.S.C. 154(b) by 0 days.

(21) Appl. No.: 11/121,619

(22) Filed: May 4, 2005

(65) Prior Publication Data

US 2005/0263504 A1 Dec. 1, 2005

(30) Foreign Application Priority Data

May 26, 2004 (JP) .............................. 2004-155943

(51) Int. Cl.
B23K 26/06 (2006.01)
B23K 26/08 (2006.01)

(52) U.S. Cl. .............................. 219/121.74; 219/121.81

(58) Field of Classification Search ........... 219/121.74, 219/121.78, 121.8, 121.73, 121.75, 121.79, 219/121.81
See application file for complete search history.

(56) References Cited

U.S. PATENT DOCUMENTS

| | | | | |
|---|---|---|---|---|
| 4,937,424 A | * | 6/1990 | Yasui et al. ............. | 219/121.75 |
| 5,089,683 A | * | 2/1992 | Stephenson et al. ..... | 219/121.8 |
| 5,237,151 A | * | 8/1993 | Maruyama ............. | 219/121.74 |
| 5,399,835 A | * | 3/1995 | Nakata ................... | 219/121.78 |
| 5,406,048 A | * | 4/1995 | Yamazaki et al. ..... | 219/121.78 |
| 5,481,083 A | * | 1/1996 | Smyth, Jr. ............. | 219/121.78 |
| 5,670,064 A | * | 9/1997 | Nakata ................... | 219/121.73 |
| 5,854,460 A | * | 12/1998 | Graf et al. ............. | 219/121.78 |
| 2003/0222058 A1 | * | 12/2003 | Yamazaki et al. ..... | 219/121.78 |

FOREIGN PATENT DOCUMENTS

| | | | |
|---|---|---|---|
| JP | 60-015087 | | 1/1985 |
| JP | 62-254993 A | * | 11/1987 |
| JP | 03-032484 | | 2/1991 |
| JP | 4-55082 A | * | 2/1992 |
| JP | 4-253584 A | * | 9/1992 |
| JP | 07-051875 | | 2/1995 |
| JP | 8-300179 A | * | 11/1996 |
| JP | 9-155578 A | * | 6/1997 |
| JP | 11-245074 A | * | 9/1999 |
| JP | 2001-281582 A | * | 10/2001 |
| JP | 2001-293587 A | * | 10/2001 |
| JP | 2001-334376 A | * | 12/2001 |
| JP | 2001-334380 A | * | 12/2001 |

\* cited by examiner

*Primary Examiner*—Geoffrey S. Evans
(74) *Attorney, Agent, or Firm*—Renner, Otto, Boisselle & Sklar, LLP

(57) ABSTRACT

A reflector-mirror drive shaft controller is provided for a laser beam machine which optimizes a beam for workpiece thickness by correcting a control axis of a laser reflector-mirror of a laser beam machine. A laser beam outputted from a laser oscillator device of a laser beam machine is reflected by a reflector-mirror via an output mirror and introduced into a laser machining tool. When a machining head moves along an X axis, the reflector-mirror is moved along a U axis parallel to the X axis to keep optical path length constant. By giving an offset α to U axis control, the incident beam diameter D to the machining lens is varied to form an optimum machining beam for workpiece thickness.

2 Claims, 11 Drawing Sheets

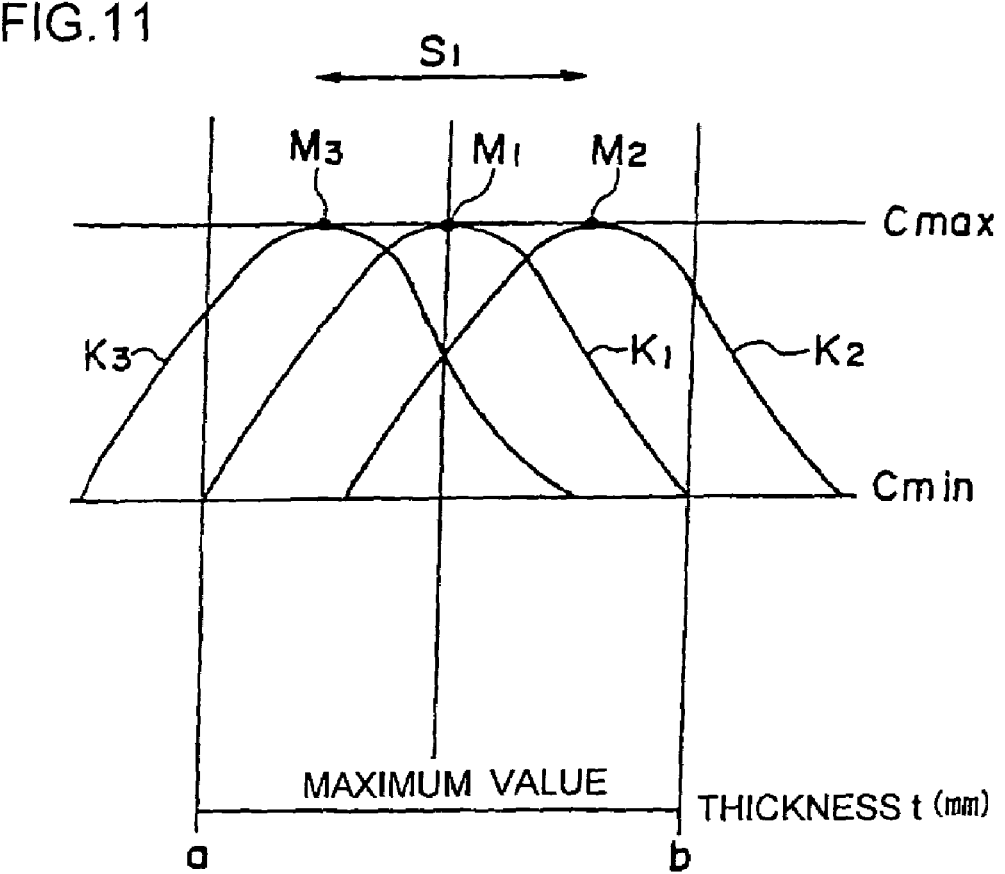

REFLECTOR-MIRROR DRIVE SHAFT CONTROLLER FOR LASER BEAM MACHINE

The present application is based on and claims priority of Japanese patent application No. 2004-155943 filed on May 26, 2004, the entire contents of which are hereby incorporated by reference.

BACKGROUND OF THE INVENTION

1. Field of the Invention

The present invention relates to a reflector-mirror drive shaft controller which makes it possible to use unskilled operators in operating a laser beam machine, maximize quality and productivity for each material and workpiece thickness, and accomplish long, unattended operation under optimum machining conditions.

2. Description of the Related Art

Conventionally, laser machining involves placing a lens at an end of an optical path of a laser beam emitted from a laser oscillator device, setting a workpiece near the focal position of the lens, and machining the workpiece through instantaneous evaporation.

The focal length of the machining lens greatly affects machining and the optimum focal length varies with the material and workpiece thickness. Thus, it is necessary to keep machining lenses with different focal lengths on hand, select the optimum focal length in each case according to the material and workpiece thickness, and make proper settings manually. The machining lens with the optimum focal length for the material and workpiece thickness is selected.

However, when the material and workpiece thickness change continuously, it is practically impossible to prepare machining lenses of focal lengths which vary continuously and steplessly, making it necessary to prepare several machining lenses of typical focal lengths which vary stepwise (e.g., 2.5 inches, 3.5 inches, 5.0 inches, 7.5 inches, etc.) based on experience.

There is a known technique which maintains optimal distance between a condenser lens and workpiece using beam diameter measured by a laser beam diameter detector installed below the condenser lens (see Japanese Patent Laid-Open Publication No. 7-51875 (Patent Document 1)).

When a machining lens with a certain focal length is selected, the lens is designed to machine workpieces in a certain thickness range (e.g., workpiece thickness: a to b mm).

In that case, machining quality produced by the machining lens with the selected focal length has a normal distribution between a and b.

Maximum machining quality is available only for one workpiece thickness between a and b. Other thicknesses do not provide the maximum machining quality, but they provide practically acceptable quality based on personal judgment of the operator.

In other words, the maximum quality is not available except for one workpiece thickness.

Similarly, there also exists a maximum machining speed between a and b, meaning that the maximum machining speed is not available for every workpiece thickness. Thus, maximum productivity is not available.

SUMMARY OF THE INVENTION

The present invention provides a reflector-mirror drive shaft controller for a laser beam machine to solve the above problems.

A laser beam machine according to the present invention comprises, as basic means, a bed, a pallet which is disposed on the bed and holds a workpiece, a column which moves along an X axis, that is, in a longitudinal axis of the bed, a saddle which is supported by the column and moves along a Y axis orthogonal to the X axis, and a machining head which is supported by the saddle and moves along a Z axis perpendicular to a plane formed by the X axis and Y axis, a laser oscillator device, an output mirror, a mirror which leads laser to a laser machining tool, and an optical path system equipped with a machining lens which collects the laser.

Also, it comprises a reflector-mirror which is moved along a drive shaft to keep length of an optical path between the laser oscillator device and the machining lens constant, and means for giving an offset to movement of the reflector-mirror, thereby adjusting diameter size of a beam incident to the machining lens to keep the diameter size constant.

The offset given to the movement of the reflector-mirror is such that the machining lens forms a machining beam best suited to laser machining of the workpiece.

By movably installing the reflector-mirror which has an NC drive shaft, the present invention makes it possible to vary the beam incident to the machining lens continuously, and thereby provide the maximum machining quality and machining speed over the entire thickness range between a and b.

Thus, the present invention provides the best machining quality and productivity over the entire thickness range between a and b using a machining lens with a single focal length.

BRIEF DESCRIPTION OF THE DRAWINGS

FIG. 11 is an explanatory diagram illustrating effect of offsets.

DETAILED DESCRIPTION OF THE PREFERRED EMBODIMENTS

Figure 1:
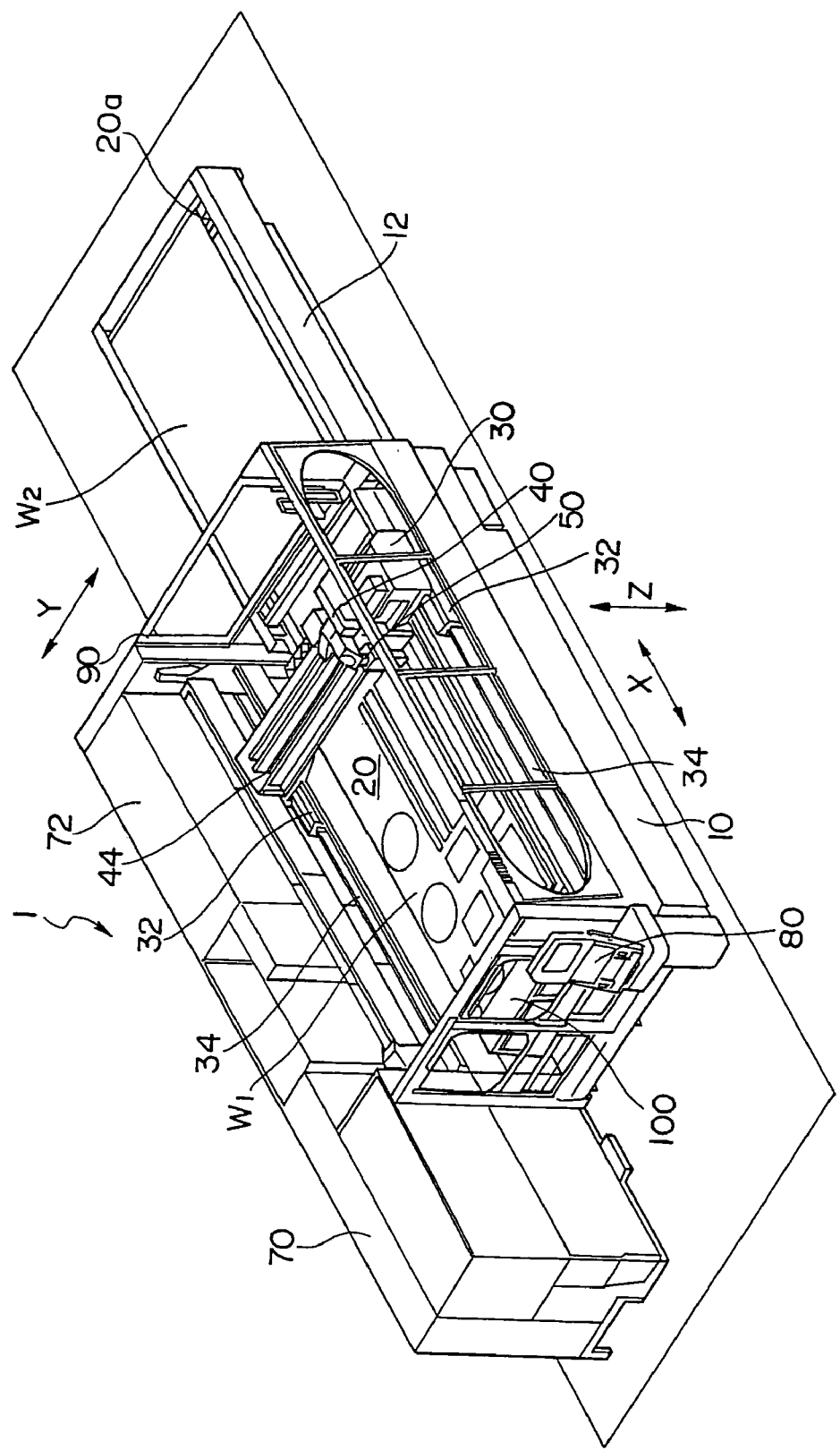
FIG. 1 is a perspective view showing an entire laser beam machine according to the present invention.
Figure 2:
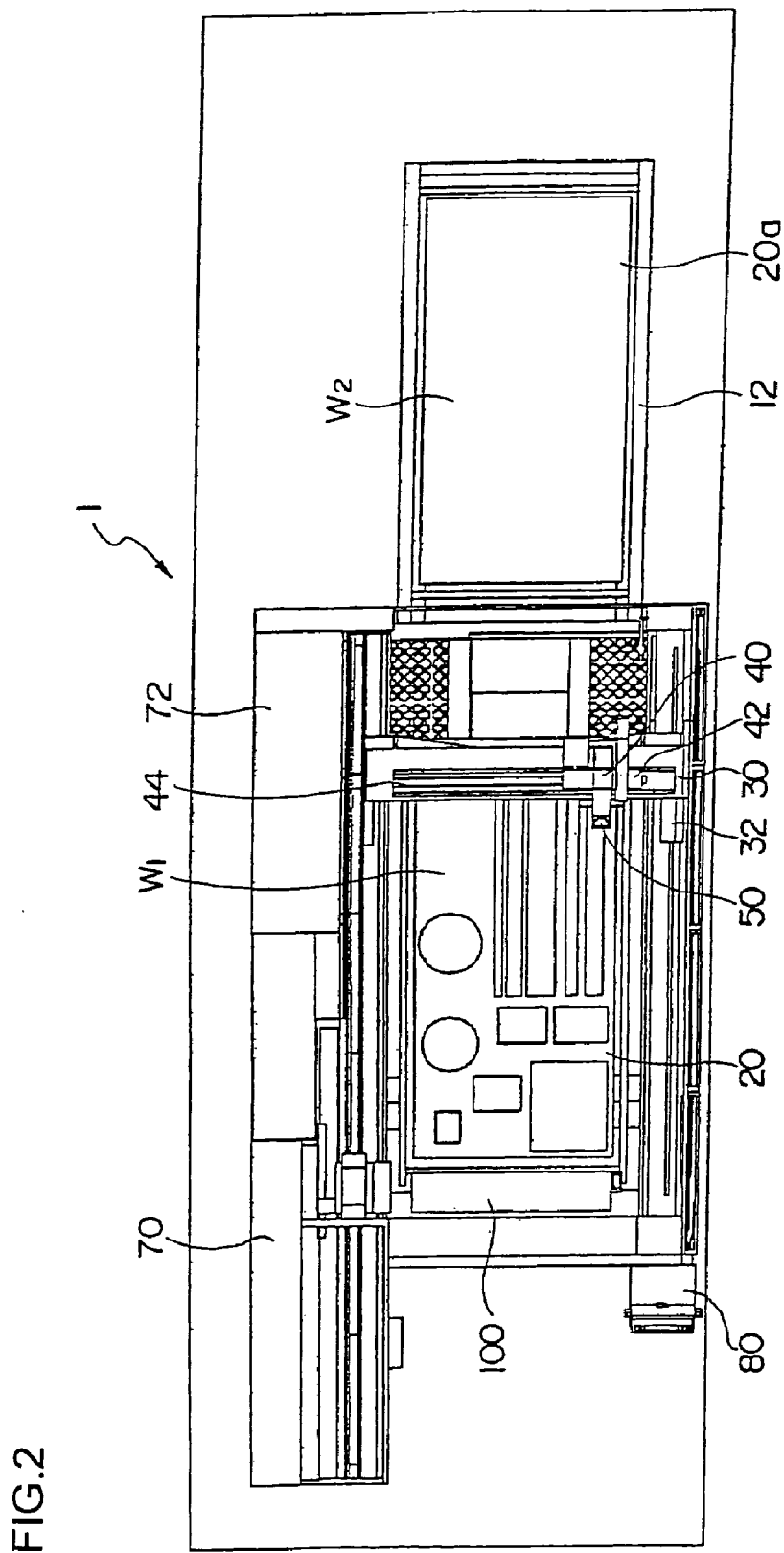
FIG. 2 is a plan view of the laser beam machine according to the present invention.
Figure 3:
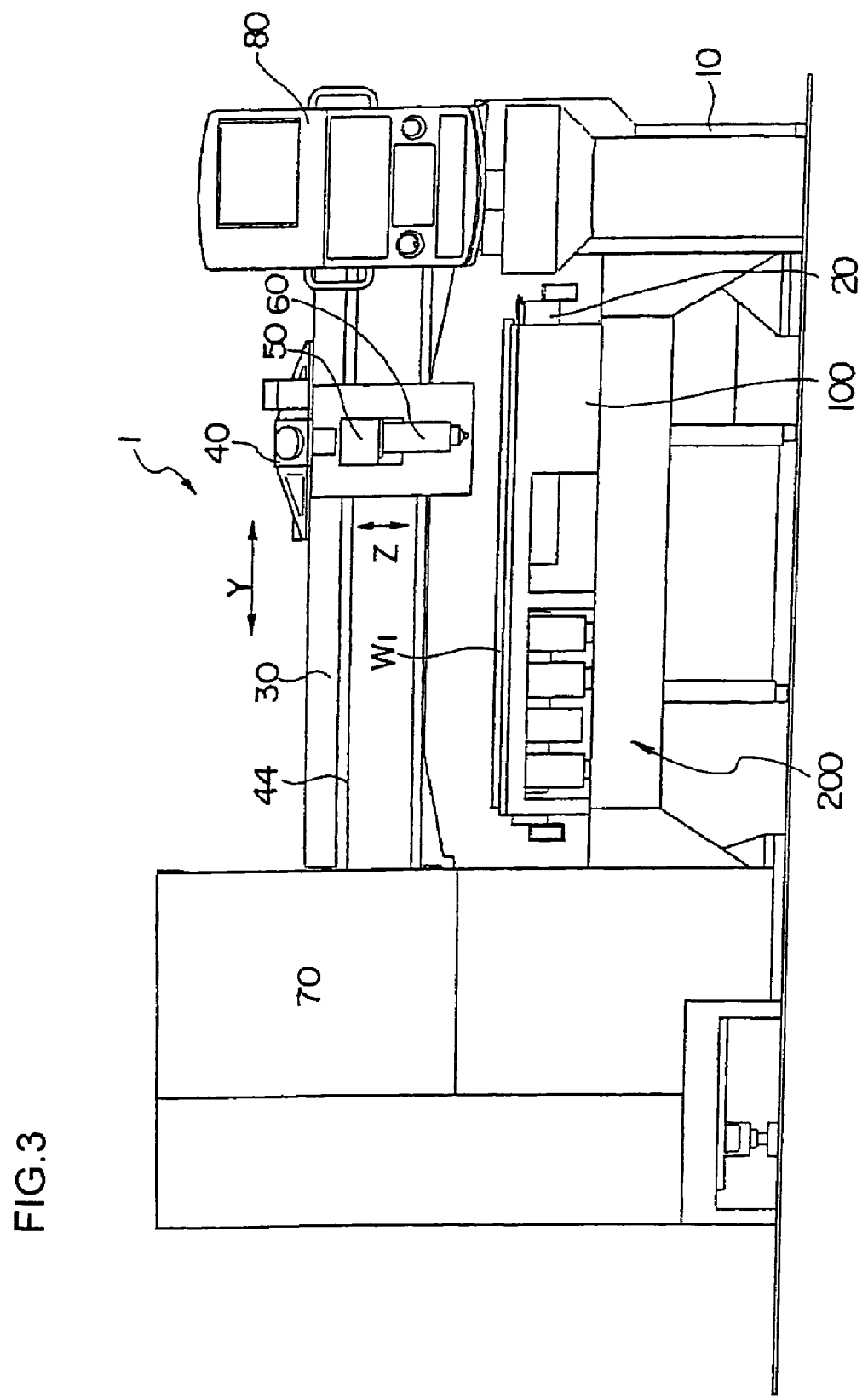
FIG. 3 is a front view of essential part of the laser beam machine according to the present invention.
Figure 4:
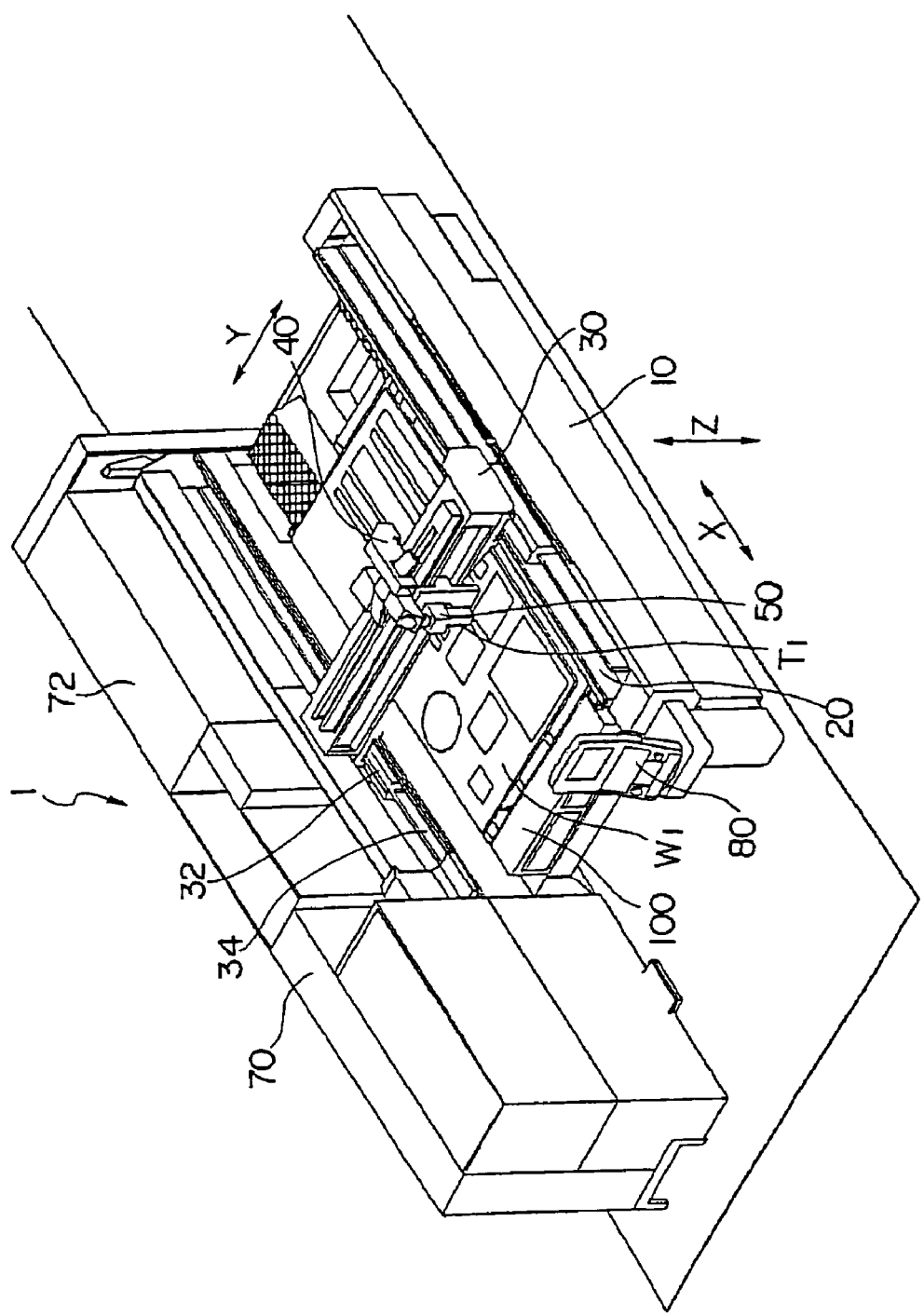
FIG. 4 is a perspective view of the essential part of the laser beam machine according to the present invention.
Figure 5:
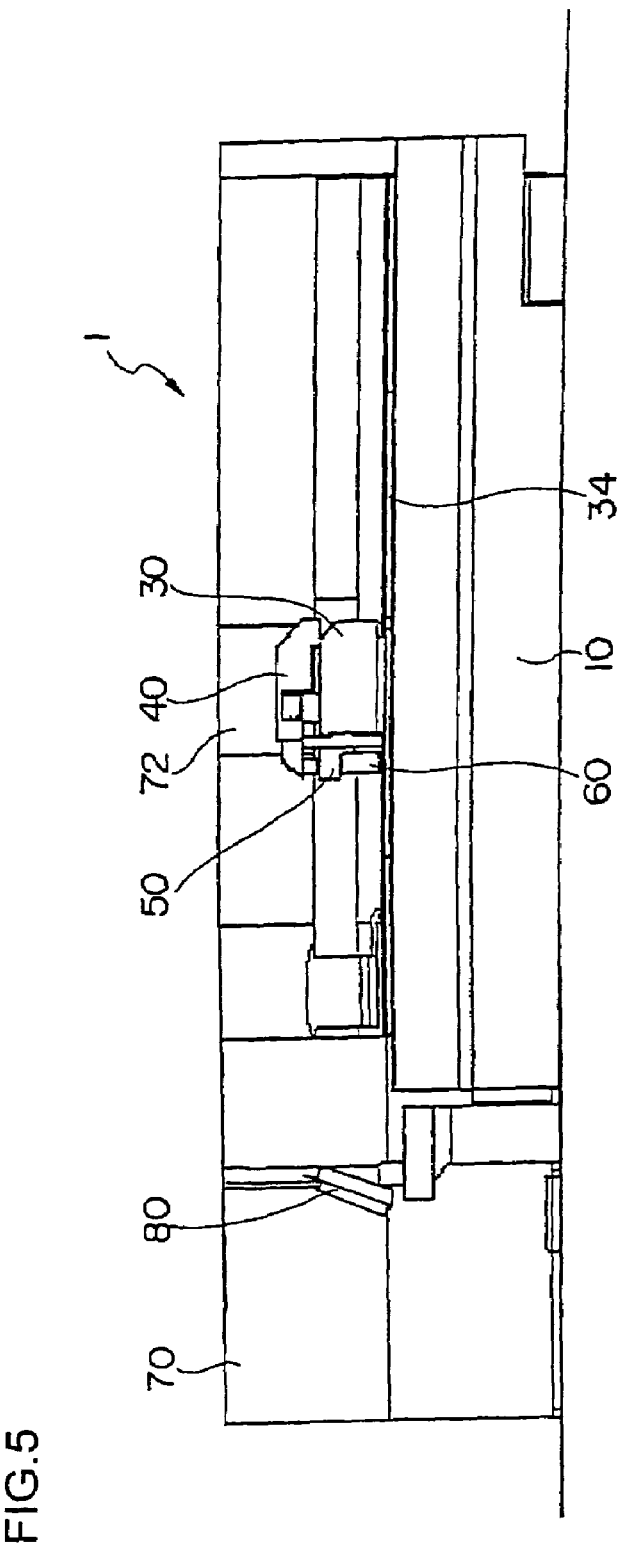
FIG. 5 is a side view of the essential part of the laser beam machine according to the present invention.

FIG. 1 is a perspective view showing an overall configuration of a laser beam machine according to the present invention, FIG. 2 is a plan view, FIG. 3 is a front view, FIG. 4 is a perspective view of the relevant portion, and FIG. 5 is a side view.

A laser beam machine, generally denoted by reference number 1, has a pallet (table) 20 which is disposed on a bed 10 to carry a plate-shaped workpiece $W_1$. A pallet changer 12 is placed on the longitudinal extension of the bed 10, and a pallet 20a carrying a workpiece $W_2$ to be machined next is awaiting its turn.

A pair of guide rails 34 are installed on both sides of the bed 10 along its length and a column 30 is mounted on the guide rails 34 in such a way as to be movable along an X axis.

Means for driving the column 30 along the X axis is provided by, for example, a linear motor, which is formed by a stator installed on the guide rails 34 and a moving member installed on a linear-motion guide 32.

A guide rail 44 is installed on the column 30 along a Y axis orthogonal to the X axis and a saddle 40 is mounted in such a way as to be movable along the Y axis. The saddle 40 is equipped with a linear-motion guide 42 which is engaged with the guide rail 44. A linear motor is formed by the guide rail 44 and linear-motion guide 42.

The saddle 40 has a guide rail installed along a Z axis perpendicular to the plane formed by the X axis and Y axis and has a machining head 50 mounted in such a way as to be movable along the Z axis. The machining head 50 has an optical system which admits a laser beam from a laser oscillator 72.

The machining head 50 is equipped replaceably with a laser machining tool 60. A machining area is fitted with a cover 90 to ensure safety. A power panel 70 and the laser oscillator 72 are disposed adjacent to the bed 10. A control panel 80 for use by the operator to give various commands is disposed on a longitudinal end of the bed 10. A setup station 100 for laser machining tools is installed on that end of the bed 10 which is closer to the control panel 80.

Figure 6:
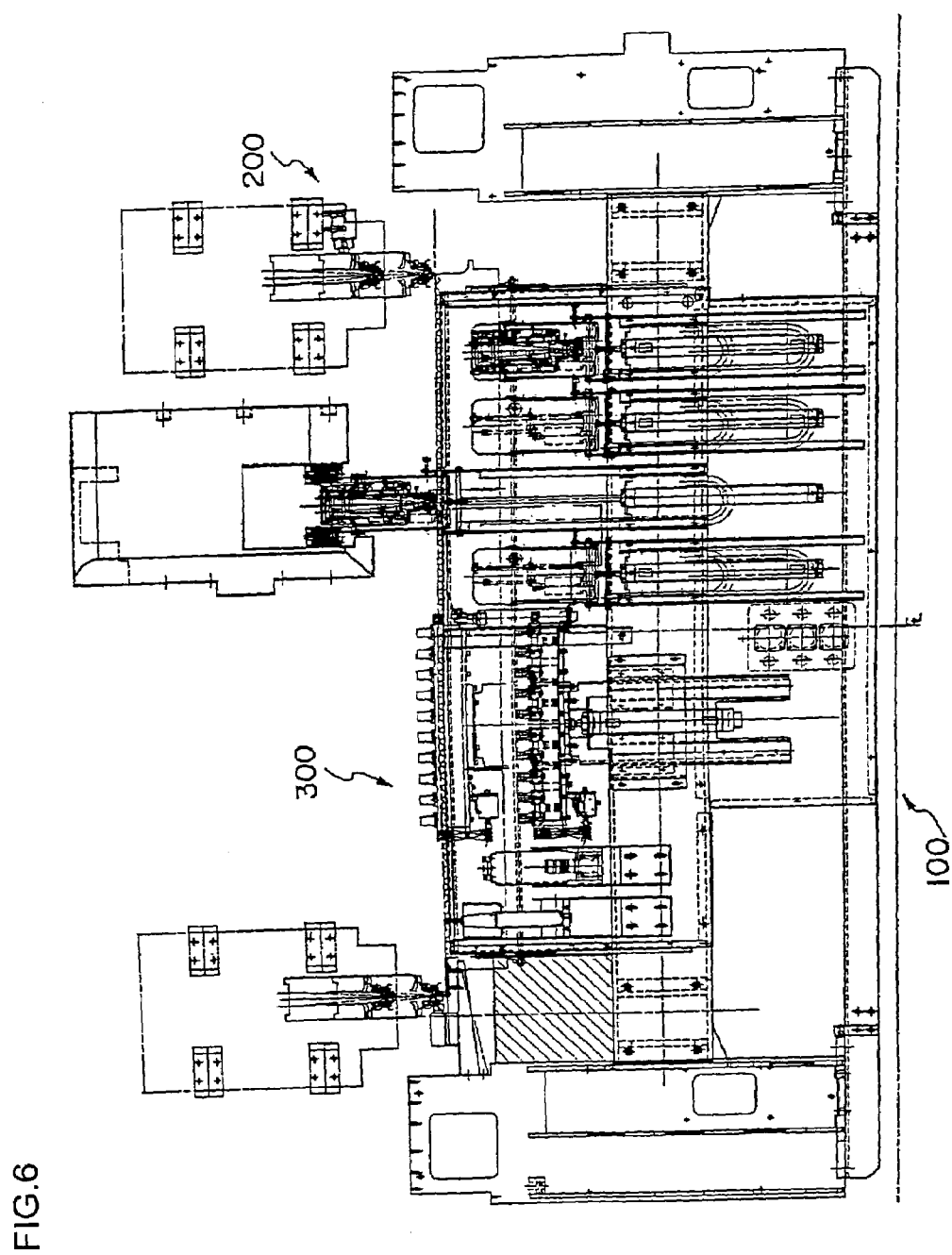
FIG. 6 is a front view of a setup station for laser machining tools.
Figure 7:
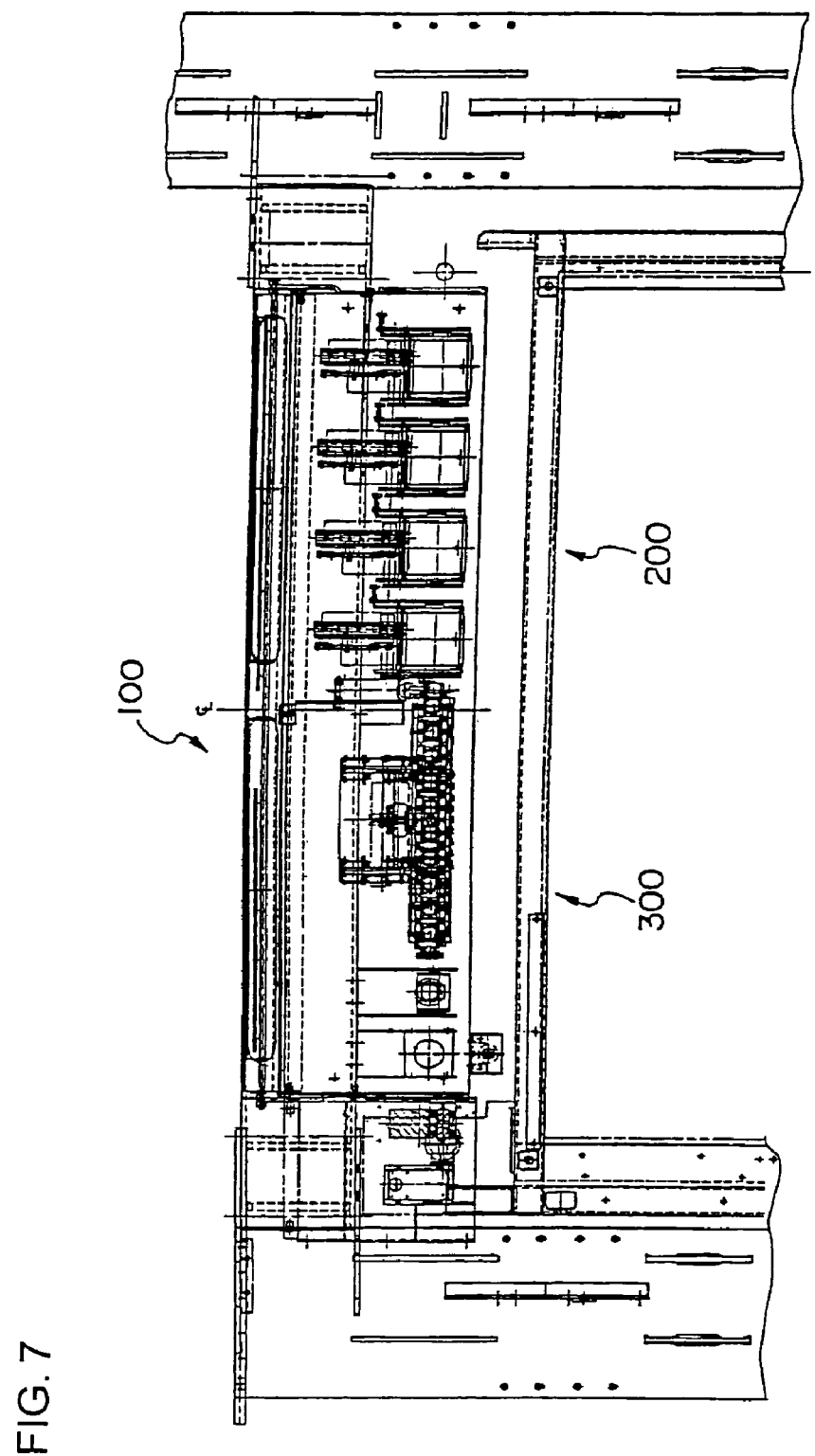
FIG. 7 is a plan view of the setup station for laser machining tools.

FIG. 6 is a front view of the setup station 100 for laser machining tools as viewed from the table and FIG. 7 is a plan view.

The setup station 100 for laser machining tools includes a tool station 200 and nozzle station 300, where the tool station 200 is equipped with a tool change magazine for laser machining tools which in turn are equipped with a torch and nozzle while the nozzle station 300 is equipped with a nozzle change magazine for nozzles of laser machining tools.

Figure 8:
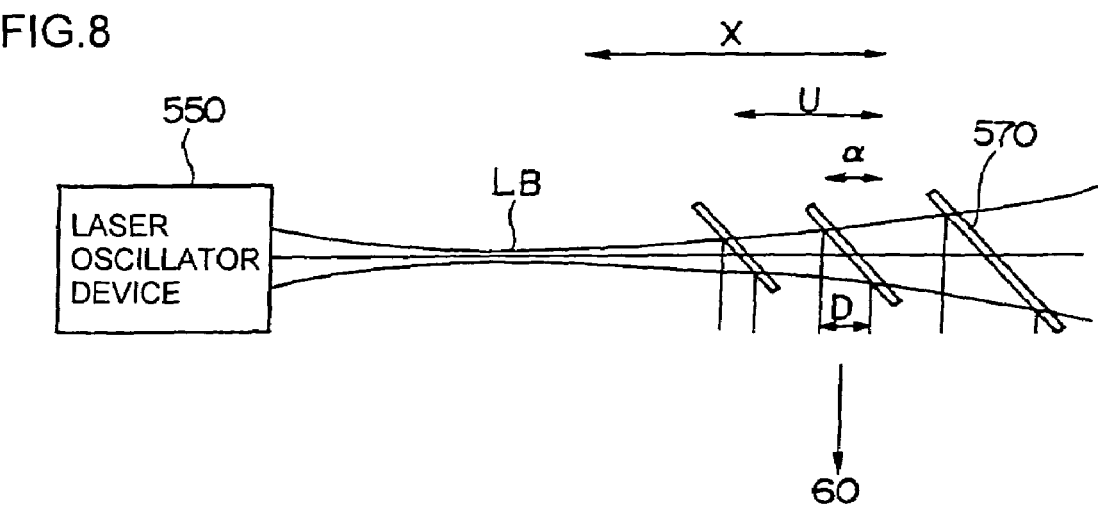
FIG. 8 is an explanatory diagram illustrating a reflector-mirror drive shaft controller.
Figure 9:
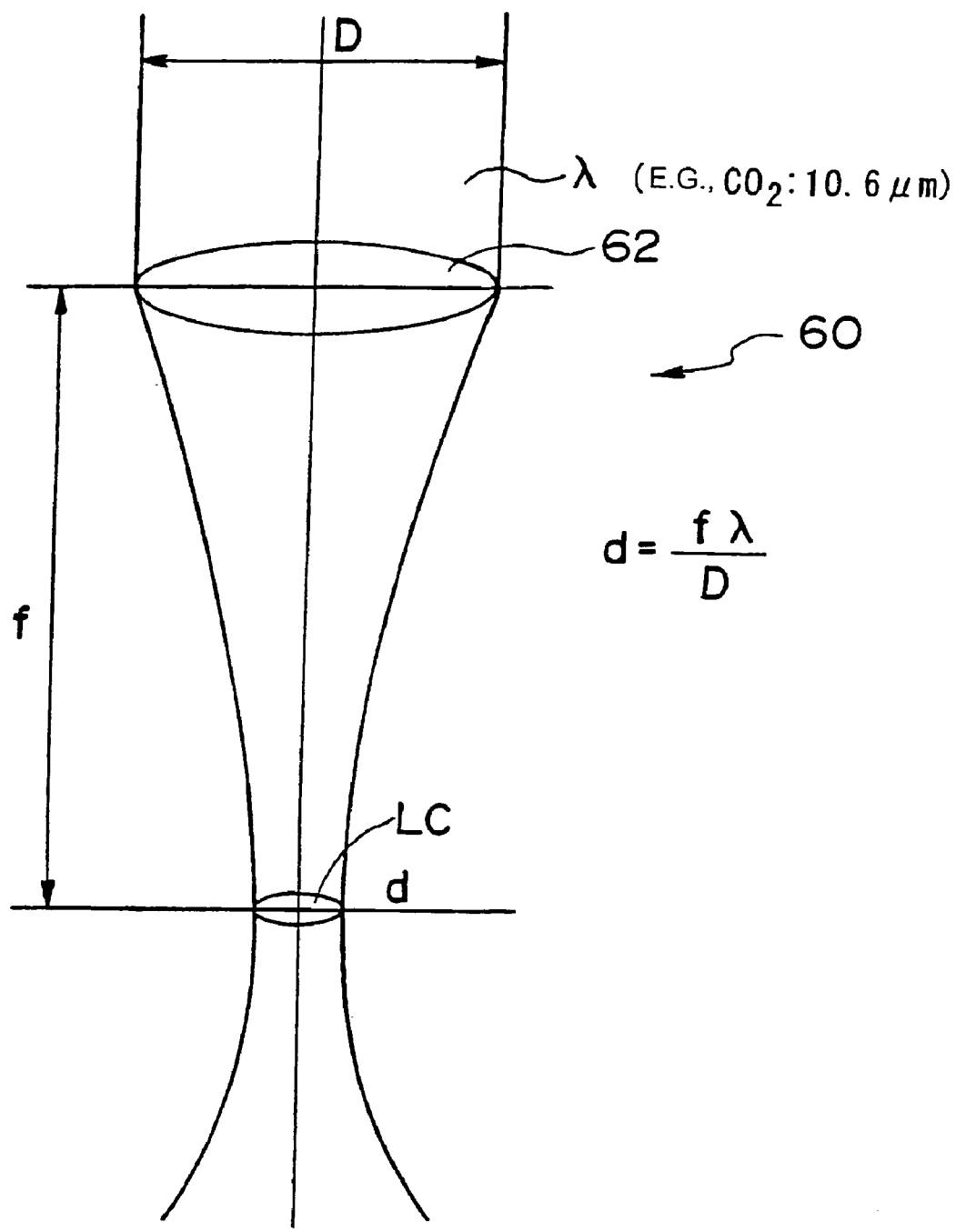
FIG. 9 is an explanatory diagram illustrating a relationship between incident beam diameter and focal position of a machining lens.

FIG. 8 is an explanatory diagram illustrating an optical path of a laser beam LB on the laser beam machine. FIG. 9 is a diagram showing a relationship between incident beam diameter and focal position.

The laser beam LB outputted from a laser oscillator device 550 is reflected by a reflector-mirror 570 and sent as a beam with an incident beam diameter D to the machining head on the laser machining tool 60.

A machining lens 62 in the laser machining tool 60 converges the beam with the incident beam diameter D to form a machining beam LC with a diameter d at the focal position of the machining lens.

The laser beam increases in diameter with increases in the length of the optical path, that is, with a divergence angle. The machining head can be moved to any desired position on the table, but the laser oscillator device 550 is fixed in position.

To deal with this situation, the present invention employs means of keeping the length of the optical path constant by moving the reflector-mirror 570 along a U axis parallel to the X axis at half the speed of the column 30 moving along the X axis.

Figure 10:
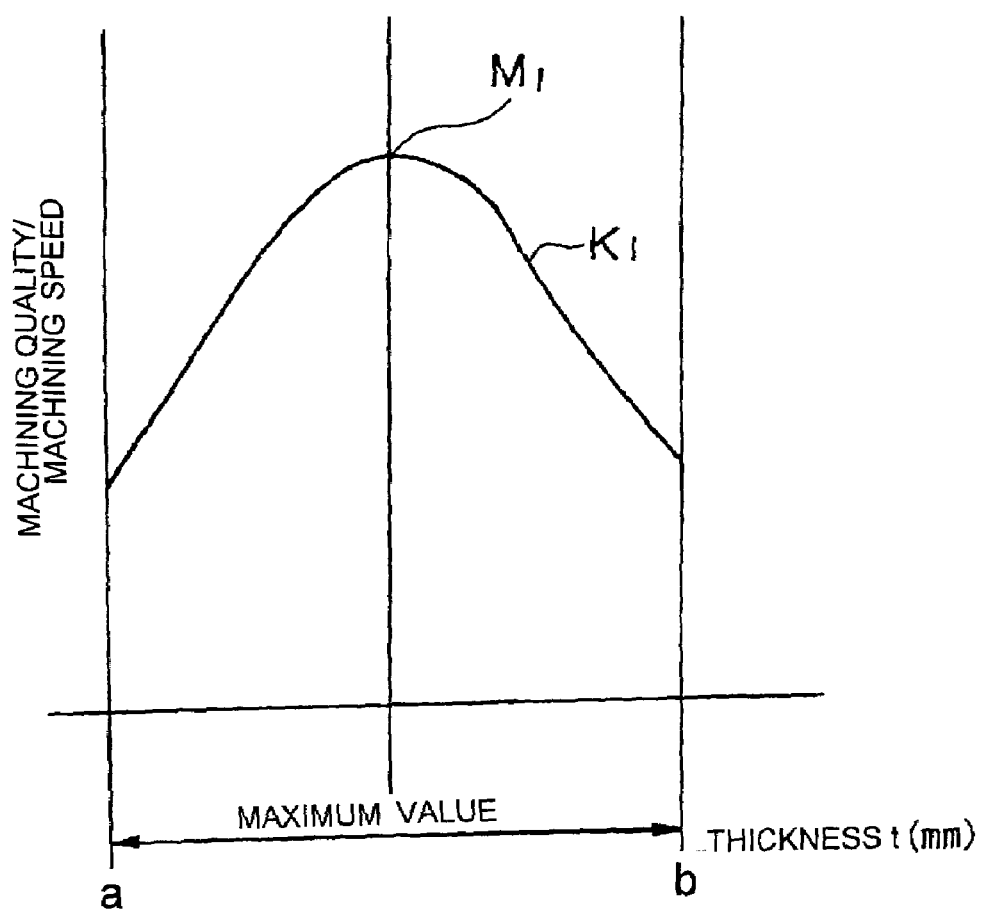
FIG. 10 is an explanatory diagram illustrating a relationship of workpiece thickness vs. machining quality and machining speed.

FIG. 10 is an explanatory diagram illustrating distribution of machining quality vs. thickness of a workpiece when a machining lens with a certain focal length is used.

With a specific machining lens, it is possible to perform machining in a thickness range between a and b, but machining quality and machining speed show a normal distribution curve $K_1$ which reaches a maximum value C when a particular workpiece thickness C is used.

The laser beam machine according to the present invention performs control which gives an offset a to the U axis, a control axis of the reflector-mirror 570, in addition to typical control based on a constant optical path length. The control of the offset a causes the reflector-mirror to move very small distances, changing the incident beam diameter D of the laser beam. The changes in the incident beam diameter D cause changes in the machining laser LC at the focal position, shifting the normal distribution curve of the machining quality and machining speed in thickness direction $S_1$ of the workpiece.

By taking advantage of this capability, the amount of offset to the U axis of the reflector-mirror 570 is determined and controlled without changing the specific machining lens to obtain maximum machining quality and machining speed for every workpiece thickness.

This configuration makes it possible to improve productivity of laser machining by simply adding an offset to NC control.

Although a linear motor has been cited in the above example as a driving means along the X and Y axes, the present invention can also be applied with a ball screw.

What is claimed is:

1. A reflector-mirror drive shaft controller for a laser beam machine that comprises a bed, a pallet which is disposed on the bed and holds a workpiece, a column which moves along an X axis, that is, in a longitudinal axis of the bed, a saddle which is supported by the column and moves along a Y axis orthogonal to the X axis, a machining head on a laser machining tool which is supported by the saddle and moves along a Z axis perpendicular to a plane formed by the X axis and Y axis, a machining lens in the laser machining tool, a laser oscillator device, and a reflector-mirror driven by the reflector-mirror drive shaft controller along a drive shaft for keeping a length of an optical path between the laser oscillator device and the machining lens constant, wherein the reflector-mirror drive shaft controller moves the reflector-mirror along the drive shaft to keep the length of the optical path between the laser oscillator device and the machining lens constant, and the reflector-mirror drive shaft controller includes means for giving an offset to movement of the reflector-mirror as a function of a range of thickness of the workpiece to adjust a diameter size of a beam incident to the machining lens across the range of thickness of the workpiece.

2. The reflector-mirror drive shaft controller for a laser beam machine according to claim 1, wherein the laser machining tool comprises a torch which has optical means including the machining lens, and a nozzle which is replaceably attached to the tip of the torch.

* * * * *